United States Patent [19]
Butter et al.

[11] Patent Number: 5,519,873
[45] Date of Patent: May 21, 1996

[54] APPARATUS FOR SWITCHING DIGITAL COMMAND EXECUTION BETWEEN A GENERAL PURPOSE MICROPROCESSOR AND DEDICTED EXECUTION LOGIC

[75] Inventors: Adrian S. Butter, Binghamton, N.Y.; Hugh C. Holland, Brackney, Pa.; Thomas B. Mathias, Vestal; Gary A. Zisko, Apalachin, both of N.Y.

[73] Assignee: International Business Machines Corporation, Armonk, N.Y.

[21] Appl. No.: 575,578

[22] Filed: Aug. 31, 1990

[51] Int. Cl.⁶ .................................................. G06F 9/00
[52] U.S. Cl. ......................... 395/800; 395/375; 364/230; 364/262.4; 364/DIG. 1
[58] Field of Search ................................... 395/375, 800

[56] References Cited

U.S. PATENT DOCUMENTS

| | | | |
|---|---|---|---|
| 3,678,467 | 7/1972 | Nussbaum et al. | 395/375 |
| 4,514,804 | 4/1985 | Kimoto | 395/375 |
| 4,642,757 | 2/1987 | Sakamoto | 395/550 |
| 4,870,573 | 9/1989 | Kawata et al. | 395/375 |
| 5,093,908 | 3/1992 | Beacom et al. | 395/375 |
| 5,148,525 | 9/1992 | Ohga et al. | 395/250 |
| 5,226,122 | 7/1993 | Thayer et al. | 395/275 |

*Primary Examiner*—Alyssa H. Bowler
*Assistant Examiner*—Alpesh M. Shah
*Attorney, Agent, or Firm*—Pollock, Vande Sande & Priddy

[57] ABSTRACT

Apparatus for transferring control of digital command execution from dedicated digital logic to an off chip microprocessor. A command register receives said digital commands. A decoder connected to the command register will be connected via a decoded command to a filter where it may be passed to a dedicated execution logic circuit for execution, or blocked from execution, depending on a preset block code in the filter. Blocked commands are identified by an interrupt to the microprocessor, permitting the microprocessor to execute the command.

4 Claims, 1 Drawing Sheet

APPARATUS FOR SWITCHING DIGITAL COMMAND EXECUTION BETWEEN A GENERAL PURPOSE MICROPROCESSOR AND DEDICTED EXECUTION LOGIC

RELATED APPLICATIONS (1) U.S. patent application Ser. No. 07/575,576, filed Aug. 31, 1990, EN990-026, now U.S. Pat. No. : 5,297,277.

(2) U.S. patent application Ser. No. 07/575,575, filed Aug. 31, 1990, EN990-029, now U.S. Pat. No. : 5,255,372.

(3) U.S. patent application Ser. No. 07/575,593, filed Aug. 31, 1990, EN990-030, now U.S. Pat. No. : 5,206,936.

The present invention relates to apparatus for switching digital command data execution between command execution systems. Specifically, a microprocessor takeover system is described which will shift execution of digital commands from dedicated execution logic circuitry to a general purpose microprocessor.

In the field of data communications, especially with respect to large scale computing systems using OEMI channel architecture, such as employed by the IBM/360/370 series of processors, data transfer rates have increased to the point where speed in handling command execution for these channels requires high speed execution logic. Microprocessor systems for microcode execution have advantages such as a greater diversity in executing various commands than is represented by dedicated logic, but they present serious disadvantages as well. Although microprocessors are capable of decoding and executing microcode relating to channel protocol, the speed at which they operate is an inhibiting factor in keeping the overall data flow rate high.

Additional to the limitations on execution speed, there is a chip space overhead which increases the expense of the resulting electronic hardware. The versatile microprocessors are complex in terms of circuit layout and packaging, increasing the cost of the hardware.

Some of these problems may be solved by using dedicated logic which execute commands at an increased speed, with a reduction in the amount of required substrate space, as well as a lower component cost. These dedicated logic chips, however, are inflexible in terms of permitting the introduction of new commands to a dedicated logic chip which was not originally configured to handle the command.

The present invention seeks to provide the benefits of both microprocessor execution as well as dedicated logic circuit execution. In this way, commands which were not originally taken into account when the dedicated logic execution circuitry was fabricated may be handled by an onboard microprocessor, having the flexibility to recognize and execute newly-formatted commands. The benefits of increased speed, low cost and compactness are maintained by having a majority of the commands executed by dedicated logic. In those instances where the dedicated logic cannot handle a command, as either being unrecognizable or which has changed in terms of its execution sequence, it will be taken over by an off chip programmable microprocessor.

SUMMARY OF THE INVENTION

It is an object of this invention to provide an apparatus which will direct the execution of digital commands to one or more execution devices.

It is also an object of this invention to provide for execution of digital command by either dedicated execution logic circuitry or by shifting execution to a microprocessor.

It is a more specific object of this invention to provide an apparatus for taking over execution of digital commands from normal execution logic, and shifting the execution to an off chip general purpose microprocessor.

These and other objects of the invention are provided for by an apparatus which is capable of screening incoming digital commands according to predetermined criteria received from a supervisory microprocessor. The device provides for the ability to intercept commands before they are executed by dedicated logic circuitry and shift execution to a general purpose microprocessor. In this way, unknown commands may be recognized and routed to the microprocessor for execution. Known commands which are to be blocked from execution by the dedicated execution logic can also be shifted to a microprocessor wherein a decision may be made as to their execution.

In carrying out the invention in accordance with a preferred embodiment, a programmable filter is provided which will pass to dedicated execution logic circuitry only those decoded commands which are not indicated by the microprocessor as being commands to be inhibited. The inhibited commands, when detected by the filter, generate an interrupt to the microprocessor, signalling that the microprocessor is to execute the inhibited command. Appropriate control signals are provided to dedicated execution logic circuitry to prevent command execution by the dedicated circuitry.

BRIEF DESCRIPTION OF THE FIGURES

The FIGURE illustrates an apparatus for implementing a system for executing digital commands with either dedicated execution logic circuitry or by a microprocessor.

DESCRIPTION OF THE PREFERRED EMBODIMENT

Figure 1:
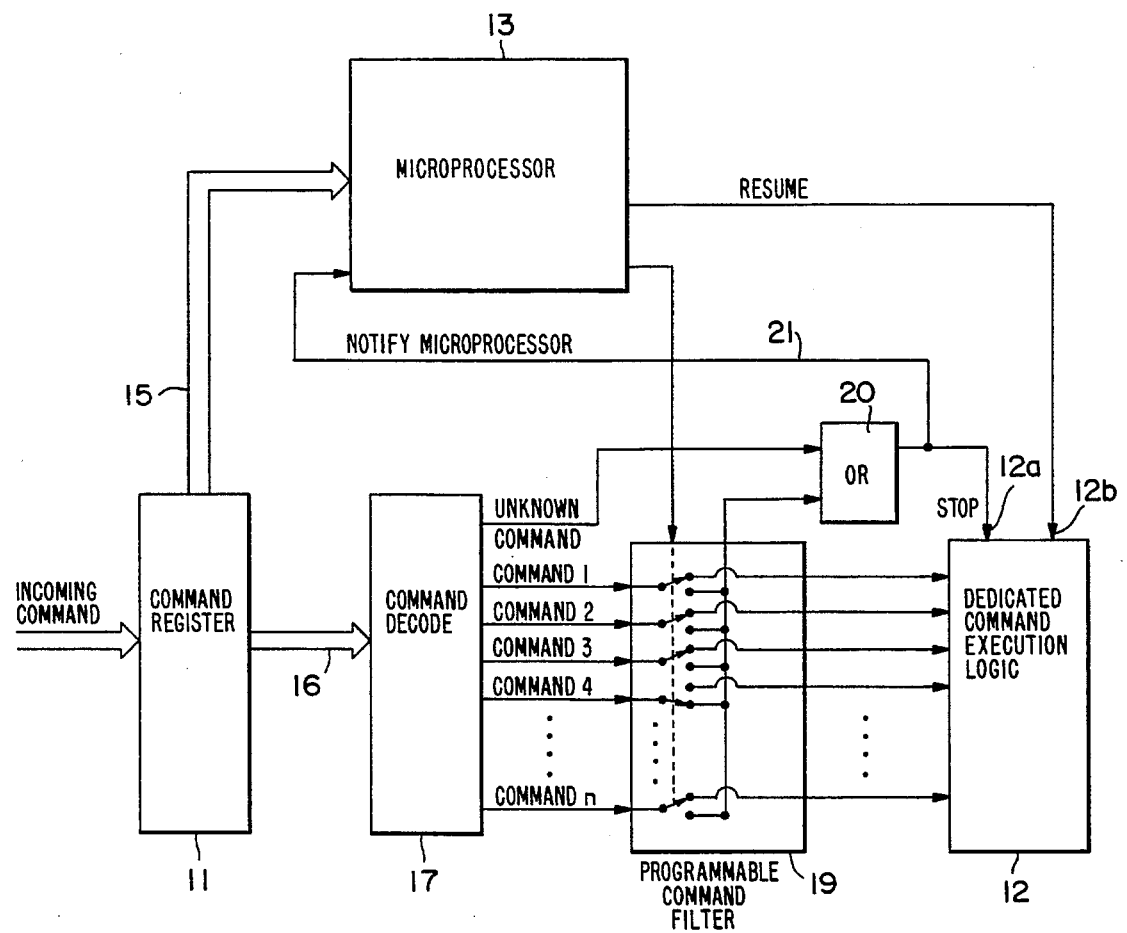

Referring to the FIGURE, there is shown a circuit which will execute incoming digital commands under normal operation conditions, using dedicated command execution logic 12. The dedicated command execution logic has the advantage of having a faster execution speed, as well as lower cost, and reduced substrate space versus that of a microprocessor. The microprocessor 13 shown in the FIGURE is off chip and is advantageously used to perform other functions, unassociated with the processing of incoming digital commands. For instance, the microprocessor 13 may be used to control the connection between a connected, large-scale computer system channel, and another channel through a channel adapter. As presently implemented, microprocessor 13 performs a link path assignment between two channel adapters in accordance with the identified related patent applications. Thus, microprocessor 13 for the most part maintains a subsidiary role in executing incoming commands.

The normal execution path includes a command register 11, for initially receiving an incoming command which, in the preferred embodiment, may be that received over a channel adapter from a connected large-scale computing system channel. The channel command would be applied via a bus 16 to a command decode circuit 17. The command decode circuit 17 will provide 1–N outputs, depending on the number of commands which are anticipated to be received over the channel interface. There is a decode output identified as an unknown command, which indicates that a digital command has been detected in command register 11 with an unknown identity. This circumstance may arise when the channel adapter is later configured with commands not anticipated or accounted for during the manufacture of the dedicated command execution logic 12. Thus, those commands which cannot be executed by the command execution logic 12, must be handled by the more versatile, programmable microprocessor 13, which is off chip, connected by a standard bus 15 to the command register 11, programmable filter 19 and dedicated execution logic 12.

Other circumstances which may require that the microprocessor 13 execute the command, rather than the dedicated execution logic, include a later attempt to block any commands for which the execution may have changed. For example, a READ command may have initially been considered having a specific execution sequence when fabricating the dedicated command execution logic circuit 12. Subsequent system changes may change the way the command is executed due to channel architecture changes or channel adapter architecture changes. Hence, the dedicated logic circuitry cannot be used to execute these revised commands.

For this circumstance, a programmable command filter 19 is provided. The programmable command filter 19 permits the interception of any decoded command so that the dedicated command execution logic 12 is inhibited from executing these commands. This is effected by having a programmable command filter 19 which may be programmed via the microprocessor so as to identify incoming commands for which the microprocessor 13 will perform the execution.

Each of the decoded outputs from the command decode circuit 17 are therefore compared with a preset command received from the microprocessor 13. The programmable command filter 19 would include a register for holding each of N possible commands for which execution is to be switched to the microprocessor 13. These preset commands are similarly decoded and compared with the incoming commands 1 through N. As schematically illustrated in the FIGURE, when these preset commands are detected to be present, the decoded commands are routed to the OR gate 20, rather than the execution logic 12. The OR gate 20 will supply a stop control signal to a stop input 12a of the command execution logic 12. Additionally, the OR gate 20 will supply an interrupt over the interrupt line 21 to the microprocessor 13.

Once the microprocessor 13 recognizes the interrupt and identifies it as being from the microprocessor takeover circuit of the FIGURE, the microprocessor 13 will read the received digital command from the command register 11, and perform execution of the digital command. The execution, once completed, will result in the microprocessor, through one of its additional I/O ports, enabling the command execution logic input 12b such that a subsequent command issued from the command register 11 will be processed in the normal way, unless other preset command data in the programmable command filter 19 results in a subsequent inhibit signal being applied through OR gate 20 to stop input 12a.

The programmable command filter 19 may be preset, as an initialization of the channel adapter which microprocessor 13 controls. Further, there may be default settings for the programmable command filter 19, permitting it to be changed as needed. Once set, the command filter 19 will either pass or inhibit any decoded command signal, matching a predefined command.

Thus, there is shown a system which permits the benefits of dedicated command execution logic including the faster execution speeds and savings in substrate space and component space. However, the inflexibility of dedicated command execution logic is overcome by the foregoing invention, permitting a microprocessor, having other more general responsibilities, to take over execution of such commands. Those skilled in the art will recognize yet other embodiments defined by the claims which follow.

Having thus described our invention, what we claim as new and desire to secure by Letters Patent is:

1. An apparatus for screening digital commands comprising:

a command register for receiving said digital commands;

a command decoder connected to said command register for providing plural signals identifying each of said digital commands;

a programmable filter connected to said command decoder for receiving said plural signals, and adapted to receive a control command from a supervisory microprocessor identifying one or more of said plural signals representing a digital command to be inhibited from execution; and, execution logic connected to said programmable filter for executing all but said one or more of said plural digital commands which are not to be executed by said execution logic, in response to a stop execution signal from said programmable filter when said one or more of said plural signals indicates a command is to be inhibited, said supervisory microprocessor being connected to receive said one or more digital commands from said command register, and connected to receive said signal from said programmable filter indicating that said one of said plural commands has been inhibited from execution by said execution logic, said supervisory microprocessor executing said one or more digital commands which are not to be executed by said execution logic, and subsequently initiating a resume command to said execution logic.

2. An apparatus for screening digital commands according to claim 1, further comprising an OR circuit connected to receive said signal from said programmable filter, and a signal from said command decoder indicating that said command register has received an unrecognizable command, said OR circuit providing said signal that a command has been inhibited to said microprocessor.

3. An apparatus for transferring control of execution of digital commands from digital logic to a microprocessor comprising:

a command register for receiving said digital commands;

a decoder connected to said command register for providing a signal identifying each command received by said command register;

a programmable filter connected to receive said identifying signals, and connected to receive a digital code representing a digital command to be blocked, said filter providing an inhibit signal when one of said identifying signals indicates that a digital command has been received corresponding to said command to be blocked;

execution logic connected to receive said identifying signals from said command decoder for executing digital commands identified by said identifying signals, and to receive said inhibit signal, whereby said execution logic is inhibited from executing said digital command to be blocked; and, a microprocessor connected to said command register and to said programmable filter, said microprocessor issuing said digital code to said programmable filter, and executing said blocked digital command in response to said inhibit signal issued from said programmable filter, and issuing a resume command to said execution logic following execution of said digital command.

4. The apparatus of claim 3 further comprising an OR gate connected to receive a signal from said decoder indicating that an unknown command has been received in said command register, and said inhibit signal, said OR gate supplying a signal to said microprocessor indicating that said microprocessor is to execute the digital command in said command register.

* * * * *